Oct. 13, 1942.　　　　E. SILBER ET AL　　　　2,298,977
SYSTEM OF ELECTRIC CURRENT GENERATION
Filed Oct. 4, 1941　　　2 Sheets-Sheet 1
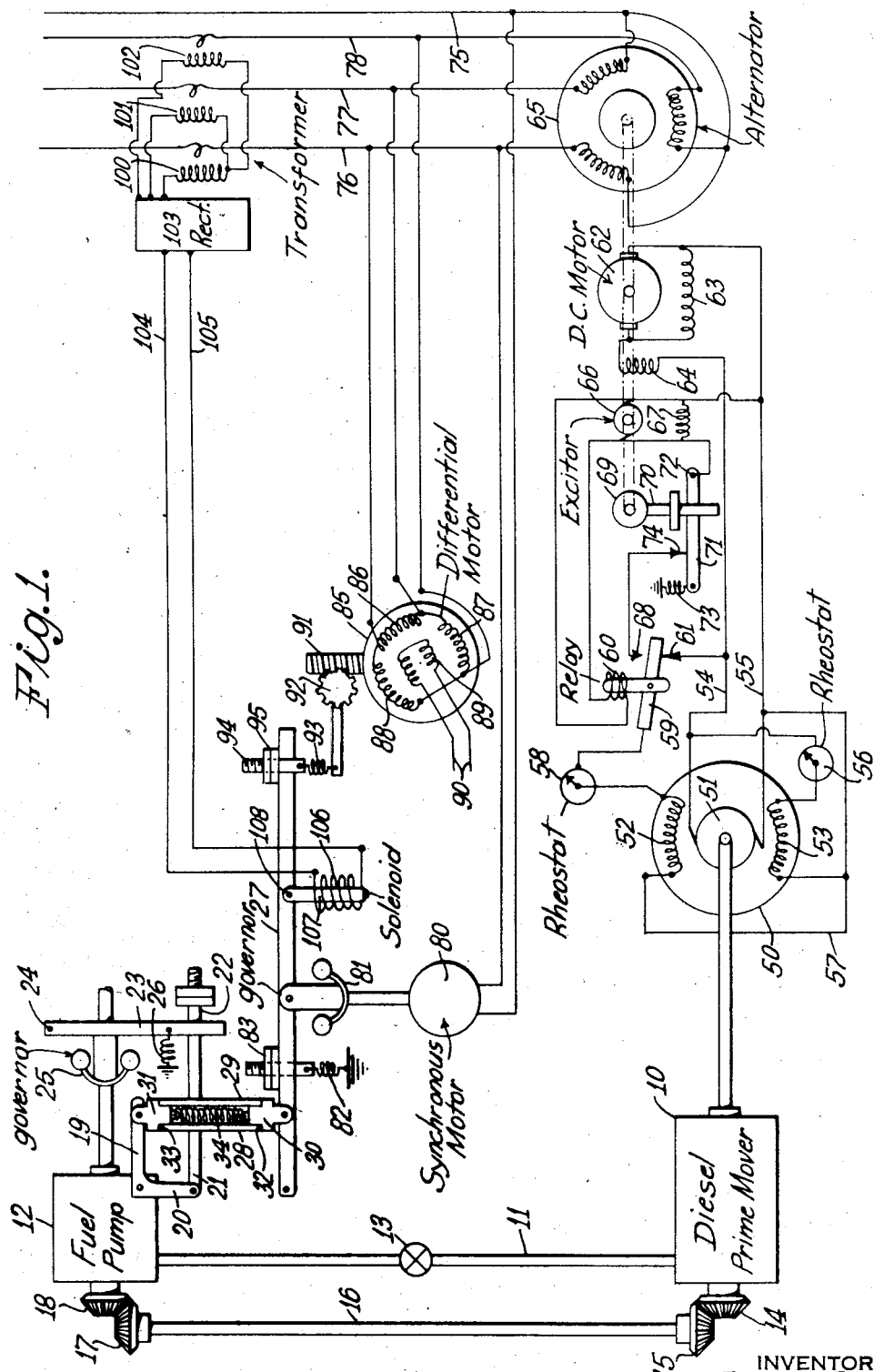
INVENTORS
EUGENE SILBER
VERNON ROOSA
BY
ATTORNEY

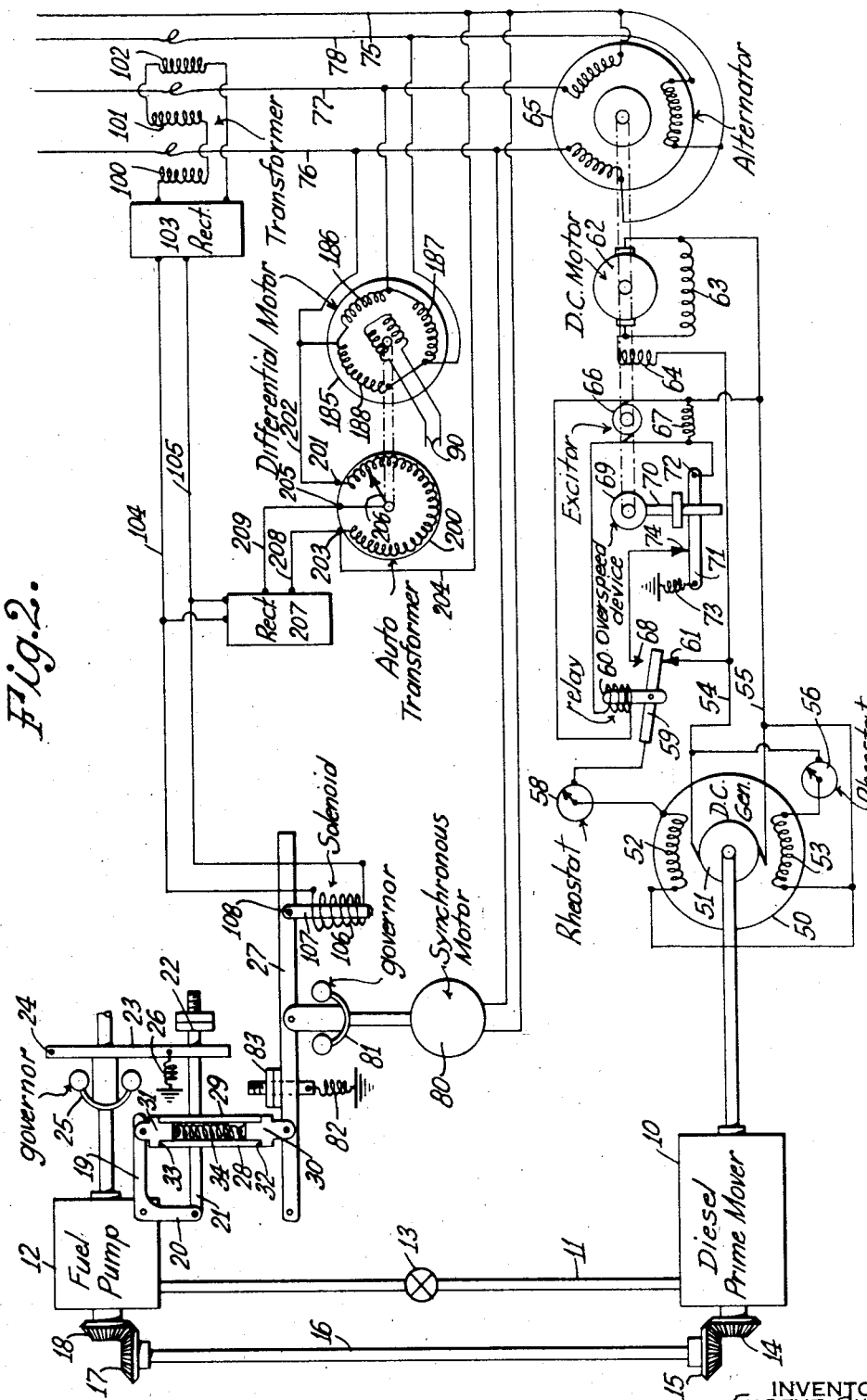

Patented Oct. 13, 1942

2,298,977

UNITED STATES PATENT OFFICE 2,298,977

SYSTEM OF ELECTRIC CURRENT GENERATION

Eugene Silber, New York, and Vernon Roosa, Ardsley, N. Y.

Application October 4, 1941, Serial No. 414,618

17 Claims. (Cl. 290—40)

This invention relates to a system of electric current generation capable of responding to wide changes in the amount of power demanded, without alteration of speed of the generator, and particularly, in the case of the generation of A. C. power, without any change in frequency. Since this invention has its greatest utility in the generation of A. C. power, that embodiment will be chosen for illustration.

In many types of power installations it is desired to generate A. C. power at constant frequency and with large load variations. In such cases the maximum power may greatly exceed the average power, and if the installation is designed to provide for the peak load the system may be required to operate for a considerable part of the time at a small fraction of its rated load.

Where an A. C. generator is directly connected to a prime mover the speed of both is determined by the frequency which it is decided to generate. It follows that the prime mover must provide for load variations at constant speed. For example, if the prime mover be a Diesel engine, this must be obtained by variations in the pressure within the cylinders. Many prime movers, however, including the Diesel engine vary greatly in efficiency with changes in pressure at constant speed whereas such engines also have the characteristic, however, that they can take care of changes in power output much more efficiently under conditions where the speed can be altered correspondingly.

Moreover, such engines having a certain rated capacity for normal running can take care of much greater overloads without overheating by such increases in speed than is possible if the entire load increase must be taken care of by increase in pressure. Thus, for any given maximum or peak load the rated capacity of the engine, and also its cost, may be much less if such variations in speed be permitted than if the overload must be taken care of at constant speed.

It is an object of this invention to provide a system in which this characteristic of the prime mover may be utilized to the full, but still maintaining the exact speed of the generator or alternator. This may be accomplished by connecting the prime mover to the alternator electrically, that is, by means of a generator directly driven by the prime mover, which, in turn, operates a motor which drives the alternator. With this arrangement it is possible to provide for variations in speed of the prime mover without correspondingly varying the speed of the alternator. It is an object of this invention to utilize this fact to take up power variations by speed changes of the prime mover while maintaining exact frequency in the alternator.

It is a further object to provide a regulating system for such a power system which will alter the speed of the prime mover in a direct response to the alternating power demand, irrespective of speed variations in the alternator, that is without waiting until the power changes have actually produced changes in the speed of the alternator.

It is a further object to provide a system in which the speed of the prime mover is primarily governed by the speed of the alternator but in which the setting of the governing means is automatically altered to compensate for every variation in A. C. load, so that the speed of the prime mover maintained by the governing means at any load is precisely the speed required to maintain the constant speed in the alternator at that load, and without harmonic hunting due to a difference in rotating masses.

It is a further object to provide a system in which the prime mover and the alternator are connected by a generator driven motor in which the voltage of the generator is varied to maintain the speed of the motor constant, and in which the excitation of the generator may be so adjusted that the changes in voltage required are accomplished substantially by speed changes in the generator rather than by increased excitation, but also to provide such a system in which sudden changes in load will not tend to stall the prime mover or to hold it from proper acceleration in accordance with the load change.

It is a further object to provide a system in which the main speed control of the prime mover is attained by a governor responding to the speed of the alternator, but in which the speed of the prime mover which the governor will maintain, is varied by the load demand on the alternator system; and further to provide such a system in which the integration of the alternations of the alternator is used to control the regulating system so that the average speed of the system is maintained absolutely in accordance with the standard selected regardless of load changes. This is particularly advantageous where the power generated is used in factories or homes, or elsewhere, to drive synchronous clocks in which the alternations are used to perform the timing function, and also to maintain proper voltage, as the voltage is a function of the frequency.

The invention accordingly comprises the device embodying features, characteristics and properties and the relationship of the elements which will be exemplified in the device herein described and the scope of the application of the invention will be indicated in the claims.

For a fuller understanding of the nature and objects of the invention, reference should be had to the following detailed description taken in connection with the accompanying drawings, in which:

Figure 1 is a diagrammatic view of a power system embodying this invention. Figure 2 is a similar view, or modification.

In the drawings the numeral 10 comprises a prime mover such, for example, as a steam or water turbine, a steam engine or, as in the embodiment illustrated, a Diesel engine, receiving its fuel through a conduit 11, from a fuel pump 12. For convenience of illustration the arrangement of parts upon the sheet, the fuel pump 12 is placed at the top of the sheet, and a positive connection is shown between the fuel pump and the Diesel through gears 14 and 15, a shaft 16 and gears 17 and 18, although it will be obvious that the fuel pump will be associated with the engine in actual use.

The numeral 19 designates a governor valve, operatable by the lever 20 to control the flow of energy to the prime mover at the regulated speed. The lever 20 as shown has a downwardly projecting arm connected to a rod 21 which in turn is connected to a lever 23, pivoted at 24, by a lost motion device 22. This lever 23 is arranged to be operated by a governor 25 opposing a spring 26 in such manner that as the speed of the prime mover increases the lever 23 will be moved counter clockwise, first to take up the lost motion at 22 and thereafter to operate the lever 20 to shut off the fuel. This lost motion 22 will be so arranged that the governor 25 will not come into action to control the speed of the prime mover during the normal regulation of the system, but it will come into play to protect the prime mover against excessive speeds if other regulating means shall fail.

Mounted below the lever 20 there is shown control lever 27 connected to the lever 20 by a thrust device 28. This thrust device 28 is designed normally to keep the lever 20 completely under control of the lever 27, but to yield at any time that the governor 25 urges the governor valve 19 to closed position. As illustrated, the device 28 comprises an outer cylindrical shell 29, in each end of which there is inserted a plug 30 and 31, each preferably having a shoulder 32 and 33 to engage the end of the shell, at least one being slidable in the shell. A spring 34 exerts tension between the plug 30 and the plug 31 sufficient to keep the shoulders 32 and 33 flat against the ends of the shell during all normal operation, but this spring is of less force than the force which the governor 25 may exert when excessive speeds of the prime mover are reached, so that, under such conditions, the governor 25 may close the valve by stretching spring 34. Normally the control mechanism for the system is therefore associated with the lever 27.

The prime mover 10 is arranged to drive a direct current generator 50 having an armature 51 and two fields 52 and 53 respectively, and two terminals 54 and 55, one of which 55, may, for convenience, be referred to as the common. The field 53 is direct connected across the leads 54 and 55 under control of a rheostat 56. The field 52 is connected to the common by the lead 57 and its other side is connected through a rheostat 58 to the movable arm 59 of a relay 60. This arm 59 is pivoted to engage a contact 61 to connect the field 52 to the lead 54 whenever the relay 60 is deenergized.

The leads 54 and 55 from the generator are direct connected to a direct current motor 62 which preferably has a shunt field 63 and a series field 64. This motor 62 is arranged to drive an alternator 65 and preferably also an exciter 66 having a shunt field 67. One terminal of the exciter is connected to the common 55, while the other side is connected through an over speed device to a contact 68 which is in position to be engaged by the movable arm 59 of the relay 60 when the relay is energized. The coils of this relay are directly connected across the exciter so that by this construction whenever the voltage across the exciter is less than that for which the relay 60 is set, the field 52 will be in direct shunt across from the lead 54 to common, but as soon as the exciter voltage is built up the field 52 is no longer energized by the armature 51, but is energized by the exciter direct.

The advantages of this construction are as follows.

It is the normal intention of this device to build up the voltage across the leads 54 and 55 with every increase in load exactly to maintain the speed of the motor 62 constant, and thus to take advantage of the ability of the prime mover and generator to deliver overloads by increasing in speed without excessive increase in pressure or current. Any increase in the voltage across the terminals 54 and 55, however, directly increases the field excitation of every shunt field, and thus increases the voltage across the terminals out of proportion to the increase in speed. If, therefore, both fields 52 and 53 be operated as shunt fields, at all times, it would result that increase in load would in part be taken care of by an increase in pressure within the prime mover rather than by an increase of speed. This would mean that under such conditions the full advantages of this invention would not be attained, and what is still more important, that a sudden increase in load demand would throw too severe a load on the prime mover and may even prevent its acceleration to the point desired.

With the construction herein described both the fields are operated as shunt fields while the voltage is intentionally being built up in the generator, but as soon as the system goes into actual operation the excitation of the field 52 is transferred to the exciter and on this account it is held constant. At the same time the shunt field 53 will increase in excitation with the increase in voltage. The proportion between the fields 52 and 53 may be adjusted by the rheostats 56 and 58 to get the most desirable results.

The over speed device comprises an element 69, directly driven by the D. C. motor, constructed and arranged so that when a predetermined speed is reached it will exercise a downward thrust upon a rod 70 which, in turn, will engage a lever 71 pivoted at 72 and urged upwardly by spring 73 against a contact 74. As illustrated the energized terminal of the exciter 66 is connected to the pivot 72 and serves to close the circuit to the contact 68 through contact 74 at all times, unless the speed of the D. C. motor and, with it, the alternator, gets too high to be safe, in which case the over speed device will open the circuit of the field 52 at the point 74 and thus by cutting off a large part of the field of the generator 50 will reduce the voltage of the generator and bring down the speed of the motor 62.

The generator 65 will preferably be equipped with a flywheel to assist in maintaining the speed constant in spite of load fluctuations.

The alternator 65 is shown for convenience as Y connected and having a neutral 75 and three energized leads 76, 77 and 78.

A synchronous motor 80 is direct connected across one phase of the alternator, as for example from 75 to 76, and is provided with a governor 81 which is directly connected to lever 27 urging said lever in a direction opposite to the control spring 82, the tension of which is adjusted by nuts 83.

There is provided a differential motor 85 comprising three field coils 86, 87 and 88 connected across the terminals 76, 77 and 78, and internally connected in such manner as to produce a revolving field. As illustrated these are connected in Δ. Within this field there is provided a rotor 89 which may be fed with energy from any standard source of alternating current 90 from which a standard frequency may be obtained. For example, this standard frequency may be taken from a power line, or it may be artificially created by a vibrator or by other mechanical means. Whenever there is a difference between the speed of rotation of the rotating field and the alternations in the rotor, the rotor itself will turn. This rotor is shown as connected to a worm 91, driving a gear 92, connected by a spring 93 to the lever 27. Preferably the spring is connected through the medium of a threaded stud 94, carrying nuts 95, so that the tension of the spring 93 may be altered at will.

Within each of the leads 76, 77 and 78 there are provided a current transformer 100, 101 or 102 and the secondaries of these transformers are connected together to a rectifier 103 in such manner that the current delivered by the leads 104 and 105 of the rectifier responds directly to variations in the alternating current. These leads 104 and 105 are direct connected to a solenoid 106 operating the armature 107 which is pivoted to the lever 27 at 108.

This motor 80 with its governor is the principal factor in maintaining uniformity of speed of the alternator. Taken by itself, however, it would tend to maintain the lever 27 in a fixed position for a fixed speed of the alternator, whereas this system specifically demands that the lever 27 shall be adjusted to a new position to increase the speed of the prime mover with increases of load without changing the speed of the alternator. Thus the lever 27 must assume a different position for each speed of the prime mover and means must be provided to vary the adjustments so that with varying loads the actual position of the lever 27 maintained by the governor 81 will be varied. These results are achieved by the coil 106 and the differential motor 85.

The purpose of the solenoid 106 is to impose a direct pull upon the lever 27, as soon as the load in the alternating current system increases, without having to wait until the increased load has had time to change the speed of the alternator.

It will be noted that the solenoid 106 imposes a varying load upon the lever 27, as the normal load of the alternating current system varies, but this does not in any way disturb the regulating system since the differential motor in every event varies the setting of the tension upon the lever arm 27 to cause it to maintain a fixed speed in the alternating current system, thereby automatically compensating for the other factors.

When this system is first started, the field coils 52 and 53 of the generator are both connected directly in shunt and, on this account, the current voltage across the terminals 54 and 55 builds up rapidly until it starts the direct current motor 62. As soon as, however, the speed of the direct current motor builds the voltage of the excitor 66 up to that for which it is set, the relay 60 throws the field coil 52 across the excitor and thereafter this excitor coil maintains a constant field in this coil. If the field coil 52 were permanently connected across the excitor its value in building up the voltage across the generator would be lost until the voltage of the excitor were built up. If, on the other hand, the coil 52 were also permanently in shunt with its armature every increase in load, raising as it does the speed and voltage across the terminals, 54 and 55, would increase the field voltage in the coil 52 as well as in the coil 53 and the load thus suddenly thrown upon the prime mover would tend to interfere with the proper increase of speed.

In the embodiment of the invention disclosed in Figure 2, the prime mover and its connections to the alternator are the same as in the previous embodiment, and the governor valve 19 and certain of its governing parts, including the over speed governor 25 and the synchronous motor governor 81 and other connecting parts are the same as in the previous embodiment and are correspondingly numbered.

In this embodiment of Figure 2, however, the differential motor 185 does not directly control the lever 27, but does so indirectly through the coil 106 in the following manner. In this embodiment the current transformers 100, 101 and 102 are connected as in the first embodiment through rectifier 103 to control the coil 106 to vary the load upon the arm 27 in accordance with the alternating current load. The differential motor 185 having coils 186, 187 and 188 are connected as in the previous embodiment to a source of controlled frequency 90, but this differential motor instead of being connected to drive the worm 91, is connected to drive some form of apparatus which will vary the pull of the coil 106. For example, there is provided a variable auto transformer 200, connected at one end 201 to the lead 76 by a lead 202, and connected at the other end 203 by a lead 204 to the neutral 75. The central or variable voltage tap 205 comes from the variable arm 206, the position of which is determined by the differential motor. A second rectifier 207 is connected to the terminal 203 by a lead 208 and to the terminal 205 by the lead 209 and this rectifier delivers rectified current to the leads 104 and 105, in such manner as to increase or decrease the current through coil 106 as may be necessary to adjust the position of the arm 27 to the speed of the prime mover necessary to maintain the constant speed of the alternator. The rectifier as illustrated is connected in multiple across the leads 104 and 105, but whether it is connected across those leads or in series with one of them will depend upon the electrical characteristics employed, as will be understood.

The operation of this embodiment will, in general, be clear from the proceeding description. The general speed of the prime mover is determined by the governor 81 of the synchronous motor. Any change of load, however, will immediately respond by altering the setting of that governor, by varying the pull of the coil 106 as soon as the alternating current load appears.

The differential motor 185, by varying the voltage on the terminals 205 and 203 constantly adjusts the pull on the coil 106 to maintain the speed of the alternator constant.

The same principles can be applied to the generation of current at constant speed, even where the current to be generated is direct current instead of alternating, for it will be observed that the shaft, on which the D. C. motor 62 and the alternator 65 revolve, is maintained at constant speed. It follows that a direct current generator mounted upon that shaft would also be maintained at constant speed. This system may, therefore, be employed to generate direct current, according to the same principles, if the alternator 65 which is used to maintain the speed of its shaft constant, be a small one suitable only for that purpose without delivering any load current, and if the main electric generator be mounted upon that same shaft, having its speed controlled in accordance with the outlines herein given.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention, herein described, and all statements of the scope of the invention which as a matter of language might be said to fall therebetween.

Having described our invention, what we claim as new and desire to secure by Letters Patent, is:

1. A power generating system comprising a D. C. generator, a prime mover connected to drive said generator, an alternator, a D. C. motor driven by said generator connected to drive said alternator, a governor responsive to the speed of the alternator, and connected to vary the power input to the prime mover whereby variations in load of the alternator will vary the speed of the prime mover, to maintain a constant speed of said alternator.

2. A power generating system comprising a D. C. generator, a prime mover connected to drive said generator, an alternator, a D. C. motor driven by said generator connected to drive said alternator, means directly responsive to the output load of said alternator for varying the power input to the prime mover whereby variations in load of the alternator will vary the speed of the prime mover independent of speed variations of the alternator.

3. A power generating system comprising a D. C. generator, a prime mover connected to drive said generator, an alternator, a D. C. motor driven by said generator connected to drive said alternator, means directly responsive to the output load of the alternator, for varying the power input to the prime mover in accordance with any change in load, and a governor responsive to the speed of the alternator, directly controlling the speed of the prime mover, whereby the speed of the prime mover is maintained such as to keep the alternator at a constant speed and whereby any sudden change in load or speed of the alternator will instantly make a corresponding change in the power input to the prime mover to correct any change in the speed to the alternator.

4. A power generating system comprising a D. C. generator, a prime mover connected to drive said generator, an alternator, a D. C. motor driven by said generator connected to drive said alternator, a synchronous motor and governor, responsive to the speed of the alternator, for varying the power input to the prime mover, constructed and arranged to maintain a set speed of the prime mover, a means responsive to the speed of the alternator for varying the said set speed of the prime mover, whereby the speed of the alternator is maintained constant regardless of the load.

5. A control device for alternating current systems of the character having a prime mover driving a generator which in turn drives a D. C.-A. C. generator set and having a governor for maintaining the speed of the prime mover, said control device comprising, a differential motor having a pair of inter-acting fields at least one of which is of the revolving type, one of said fields being adapted to be actuated by the alternator and the other of said fields being adapted to be actuated by a comparison current, said fields being movable relative to each other and means actuated by said relative motion adapted to be connected to vary the speed setting of the governor.

6. A device in accordance with claim 5, having in combination therewith, a solenoid member adapted to be connected to said governor and to be operated by the load upon the alternator and to change the setting of the governor in accordance with changes in load in the alternator.

7. An A. C. power system comprising a prime mover, a generator driven by said prime mover, a motor driven by said generator, an alternator driven by said motor, means responsive to the speed of the alternator for controlling the input to the prime mover, and means responsive to the alternations of the generated power to vary the response of the controlling means to insure that the speed of the alternator will remain constant.

8. An A. C. power system comprising a prime mover, a generator driven by said prime mover, a motor driven by said generator, an alternator driven by said motor, a governor driven in synchronism with the alternator for controlling the power input to the prime mover, and a differential motor having a field and rotor one of which is actuated by the generated power and the other by a frequency standard, constructed and arranged to be actuated by the differential movement of the said field and rotor, to alter the flow of power to the prime mover at any given setting of the governor whereby the speed of the alternator is maintained constant regardless of load.

9. An A. C. power system comprising a prime mover, a generator driven by said prime mover, a motor driven by said generator, an alternator driven by said motor, a governor driven in synchronism with the alternator constructed and arranged to control the flow of power to the said prime mover to maintain a set speed of said alternator, a differential motor having a field and rotor one of which is actuated by the generated power and the other by a frequency standard, constructed and arranged to be actuated by the differential movement of said field and rotor to alter said set speed to correspond to changes in the frequency output of the alternator.

10. An A. C. power system comprising a prime mover, a generator driven by said prime mover, a motor driven by said generator, an alternator driven by said motor, means responsive to the speed of the alternator for controlling input to the prime mover, and means responsive to the load output of the alternator to vary the response of the controlling means to vary the power input of the prime mover with every change in load, irrespective of any change in speed of the alternator caused by said load.

11. An A. C. power system comprising a prime mover, a generator driven by said prime mover, a motor driven by said generator, an alternator driven by said motor, a governor valve for said prime mover, and control lever connections between said control lever and said valve constructed and arranged yieldingly to permit the control valve to be moved toward the closed position irrespective of the position of said lever, but otherwise permitting said lever to completely control said valve, a synchronous motor driven by said alternator connected to said lever to vary the input to the prime mover and to maintain the speed of the alternator, current transformers situated in the leads of the alternating current, a solenoid having an armature connected to said lever and having a coil actuated by the energy in said current transformers, constructed and arranged to change the position of the lever whenever the current in the alternating current leads changes, whereby the governing valve is caused to respond to changes in the alternating current leads, irrespective of changes of speed of the alternator.

12. A device in accordance with claim 11, having means for integrating the alternations constructed and arranged to alter the pull upon said lever, to maintain the frequency constant.

13. A device in accordance with claim 11, having a governor actuated by the prime mover and connections between said governor and said governor valve for actuating the latter, when the prime mover reaches excessive speeds.

14. A device in accordance with claim 11, having a governor actuated by the prime mover and connections between said governor and said governor valve for actuating the latter, when the prime mover reaches excessive speeds.

15. An A. C. power system comprising a prime mover, a generator driven by said prime mover, a motor driven by said generator, an alternator driven by said motor, a governor valve for said prime mover, a lever for operating said governor valve, a governor responsive to the speed of the alternator for actuating said lever, a solenoid having a core connected to said lever and a coil connected to respond to the current in the alternating current leads, a differential motor having a field responsive to the alternations in the alternating current system and a rotor responsive to the standard frequency, said differential motor being constructed and arranged to impose a bias upon said lever and to vary said bias in a direction to restore the frequency.

16. An A. C. power system comprising a prime mover, a generator driven by said prime mover, a motor driven by said generator, an alternator driven by said motor, a governor valve for said prime mover, a lever for operating said governor valve, a governor responsive to the speed of the alternator for actuating said lever, a solenoid having a core connected to said lever and a coil connected to respond to the current in the alternating current leads, a differential motor having a field responsive to the alternations in the alternating current system and a rotor responsive to the standard frequency, said differential motor being constructed and arranged to alter the pull upon said solenoid in a direction to correct the frequency.

17. An A. C. power system comprising a prime mover, a generator driven by said prime mover, a motor driven by said generator, an alternator driven by said motor, a governor valve for said prime mover, a lever for operating said governor valve, a governor responsive to the speed of the alternator for actuating said lever, a solenoid having a core connected to said lever and a coil connected to respond to the current in the alternating current leads, a differential motor having a field responsive to the alternations in the alternating current system and a rotor responsive to the standard frequency, a voltage regulating device and means operated by said differential motor for operating said voltage regulating device, and a connection between said voltage regulating device and said coil to vary the effect of said solenoid upon said lever in a direction to correct the frequency.

EUGENE SILBER.
VERNON ROOSA.